Oct. 7, 1930.  T. V. BUCKWALTER  1,777,392
AXLE CONSTRUCTION
Filed Dec. 9, 1927

INVENTOR:
Tracy V. Buckwalter
by Cou...t Court Gravely
HIS ATTORNEYS.

Patented Oct. 7, 1930

1,777,392

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

AXLE CONSTRUCTION

Application filed December 9, 1927. Serial No. 238,969.

My invention relates to railway axles, and especially to roller bearing railway axle constructions of the type wherein the end portions of the axle are rotatably supported in bearings in journal boxes that are located beyond the wheels and have their inner ends closed by means of annular closure plates sleeved on the axle. The principal object of the present invention is to maintain an oil-tight and dust-proof joint between the closure plate and the journal box while permitting the closure plate to move with the axle when the same "cocks" or cants under service conditions. Other objects are simplicity and cheapness of construction, fewness of parts, ease of assembly and compactness of design. The invention consists principally in mounting the closure member on the axle for movement therewith independently of the journal box, and in means for maintaining a tight joint between the closure member and the journal box in all positions of movement of said closure member. It also consists in the construction, combinations and arrangements of parts hereinafter described and claimed.

Figure 1:
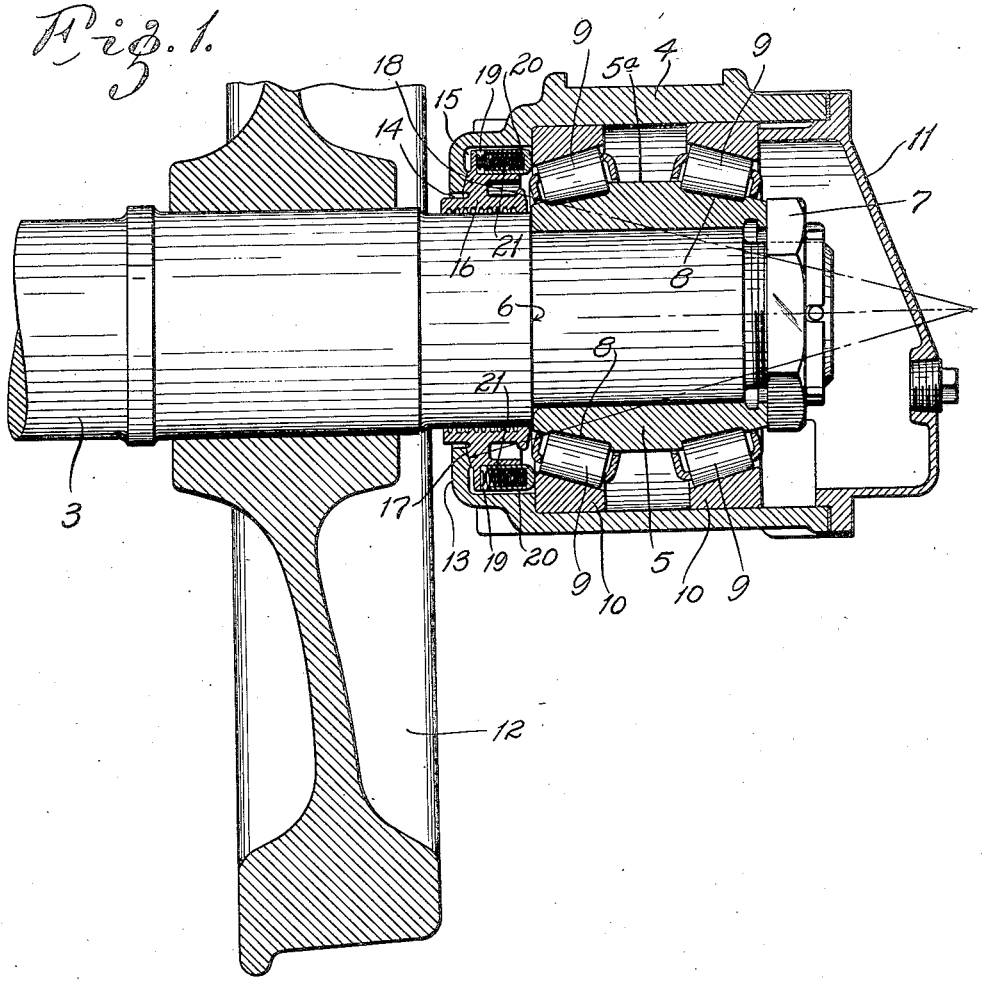
Figure 2:
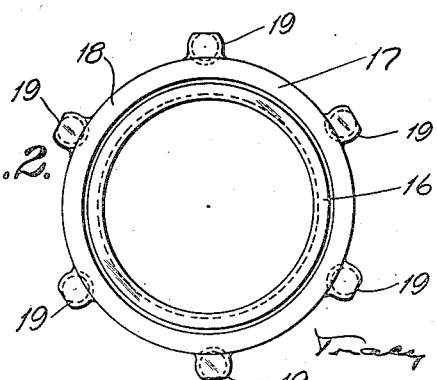

In the accompanying drawing, which forms part of this specification and wherein like symbols refer to like parts wherever they occur, Fig. 1 is a longitudinal section of the end portion of a railway car axle construction, showing the end portion of the axle journaled in roller bearings in a journal box and provided with a closure plate embodying my invention; and Fig. 2 is a view of the outer face of the closure ring.

In the railway axle construction illustrated in the accompanying drawing, the end portion of the axle 3 extends into the journal box 4 and is rotatably supported in said box by means of tapered roller bearings interposed between said axle and said box. As shown in the drawing, the roller bearing comprises an inner raceway member 5, mounted on the end portion of the axle with its inner end bearing against a shoulder 6 on the axle and held in place by a nut 7 threaded on the end of the axle. The inner raceway member 5 has a circumferential rib 5ª about midway of its length and bearing surfaces 8 that taper from said rib towards the respective ends of said inner raceway member. Cooperating with each bearing surface is a circular series of tapered rollers 9 that cooperate with cups or outer raceway members 10 seated in the journal box 4. The outer end of the journal box 4 is closed by a suitable closure cap 11, which is bolted or otherwise removably secured to the housing and has an inwardly extending annular flange adapted to enter said box and abut against the outer end of the outer raceway member or cup. A wheel 12 is press-fitted on the axle with its hub portion spaced inwardly from the inner end of the journal box 4. The inner wall 13 of the journal box 4 is provided with a central circular opening 14 adapted to loosely surround the axle, said inner wall being spaced inwardly from the bearing to form an annular chamber 15 between said wall and said bearing.

The journal box 4 serves as a reservoir for lubricant; and in order to prevent escape of oil from and entry of dust into said box through the axle receiving hole 14 in the inner wall 13 thereof, the axle 3 is provided with an annular closure member 16, which is sleeved on the axle. Said closure member comprises an internally groved hub portion, which surrounds the axle between the wheel 12 and journal box 4, and an annular body portion located within the annular recess or chamber 15 provided therefor between the inner wall 13 of the box and the inner end of the inner raceway member 5 of the roller bearing. The inner face of the closure ring 16 is provided opposite the inner wall 13 of the journal box 4 with an annular band or zone 17 having a convex spherical surface 18; and, likewise, the adjacent inner face of said wall of said journal box is also provided with a similar annular band or zone having a concave spherical surface adapted for cooperation with the convex spherical surface of the annular band on said closure member. The cooperating surfaces of the two concentric spherical zones 17 and 18 are ground and lapped to obtain an accurate fit, and the center of spherical curvature of both zones is located at the axis of the axle.

In order to hold the annular closure member with its spherical surface in contact with the spherical surface of the journal box, said closure member is provided in its outer peripheral edge with a series of annularly spaced pockets 19 adapted to receive cylindrical cups 20 containing coil springs 21. The cup receiving pockets 19 in the annular closure member extend longitudinally of the axis thereof; and the cups 20, which house the springs 21, are arranged in said pockets with their closed ends facing outward in abutting relation to the inner face of the adjacent outer raceway member 10 of the roller bearing. By this arrangement the closed ends of the cups 20 are held in engagement with the outer raceway member by the springs which press against the inner ends of the pockets in the annular closure member and thus hold the spherical land thereof in engagement with the spherical land on the inner wall of the journal box.

By the arrangement described, the annular closure member 16 is carried by the axle and is adapted to move therewith when the axle is tilted or canted in service; and an oil-tight and dust-proof joint is maintained during such movement by the cooperating surfaces of the spherical zones or lands on the closure member and journal box which are held in contact with each other by the action of the coil springs.

It is noted as an important advantage of the hereinbefore described arangement that the closure plate constitutes a push-off member for the cone or inner raceway member of the roller bearing. When it is desired to remove the roller bearing from the end of the axle the closure cap 11 and the nut 7 are removed from the end of the axle construction, which is then placed in a suitable press with the outer end of the axle in axial alinement with the ram of the press and with the inner face of the wheel abutting against the portion of the frame of the press. The ram is then forced against the outer end of the axle, and the axle, together with the cone and closure member thereon, is forced inwardly until the inner end of the closure member abuts against the outer face of the wheel and thus prevents further inward sliding movement of the cone and the closure member. The pressure of the ram against the outer end of the axle is then continued and causes the axle to be pushed through the cone and the closure member which are held stationary by the wheel. It is noted that the hub of the closure member extends inwardly beyond the inner end of the housing and thus prevents the wheel and bearing housing from coming in contact with each other during the operation of the movement of the bearing. If desired the bearing and its housing may be removed from the axle by holding the axle against movement while pressing the wheel outward thereon against the inner end of the closure member which pushes against the cone and thereby strips the cone from the end of the axle.

The hereinbefore described construction admits of considerable modification without departing from the invention; therefore, I do not wish to be limited to the precise arrangement shown and described. For instance, the joint between the closure member and the journal box might be formed by flat surfaces on said closure and said box instead of being formed by the spherical surfaces shown and described.

What I claim is:

1. A railway car axle construction comprising an axle, a housing for the end portion thereof, an anti-friction bearing interposed between said axle and said housing, and a closure member mounted on said axle entirely between one end wall of said housing and the adjacent end of said bearing, the opposing faces of said housing and said closure ring being provided with cooperating surfaces in the form of spherical lands and means interposed between said closure member and the adjacent end of said bearing for yieldably holding the cooperating spherical lands in contact with each other.

2. A railway car axle construction comprising an axle, a journal box for the end portion of said axle, an anti-friction bearing interposed between said axle and said journal box, an annular closure member sleeved on said axle between one end of said journal box and the adjacent end of said bearing, and means interposed between said closure member and said bearing for yieldably holding said closure in engagement with said journal box.

3. A roller bearing axle construction comprising an axle, a journal box for the end portion of said axle, a roller bearing between said axle and said journal box, and an annular closure member on said axle adjacent to one end of said journal box in position to abut thereagainst, and a series of springs disposed between said closure member and said roller bearing for yieldably holding the closure member in contact with said end of said journal box.

4. A roller bearing axle construction comprising an axle, a journal box for the end portion of said axle, a roller bearing interposed between said axle and said journal box, an annular closure member sleeved on said axle between the inner end of said journal box and the inner end of said bearing, the opposing faces of said journal box and said closure member being provided with cooperating surfaces, and yieldable means cooperating with said bearing and said closure member for holding the surfaces of said journal box and said closure member in engagement with each other.

5. A roller bearing axle construction comprising an axle, a journal box for the end portion of said axle, a roller bearing interposed between said axle and said journal box, an annular closure member sleeved on said axle adjacent to the inner end of said journal box, the opposing faces of said journal box and said annular closure member being provided with cooperating surfaces in the form of spherical lands, and means for holding the spherical surfaces of said lands in engagement with each other, said means comprising a series of springs located in said journal box between the opposing faces of said closure member and said roller bearing.

6. A roller bearing axle construction comprising an axle, a journal box for the end portion of said axle, a roller bearing between said axle and said journal box, an annular closure member sleeved on said axle adjacent to the inner end of said journal box, the opposing faces of said journal box and said annular closure member being provided with cooperating surfaces in the form of concentric spherical lands, and means for holding the spherical surfaces of said lands in engagement with each other, said means comprising a series of springs located in said journal box between the opposing faces of said annular closure member and said roller bearing, said springs being supported in pockets provided therefor in said closure member.

7. A roller bearing axle construction comprising an axle, a journal box for the end portion of said axle, a roller bearing between said axle and said journal box, an annular closure member sleeved on said axle adjacent to the inner end of said journal box, the opposing faces of said journal box and said closure ring being provided with opposed annular lands disposed concentric to said axle and having cooperating concentric spherical surfaces, and means for holding the spherical surfaces of said annular lands in engagement with each other, said means comprising a series of springs located in said journal box between the opposing faces of said closure member and said roller bearing, and cups housing said springs, said cups being slidably mounted in recesses provided therefor in said closure member.

8. A roller bearing axle construction comprising an axle, a journal box for the end portion of said axle, a roller bearing between said axle and said journal box, an annular closure member sleeved on said axle adjacent to the inner end of said journal box, the opposing faces of said journal box and said closure ring being provided with cooperating surfaces in the form of concentric spherical lands, and means for holding the spherical surfaces of said lands in engagement with each other, said means comprising a series of springs located in said journal box between the opposing faces of said closure member and said roller bearing, and cups housing said springs, said cups being slidably mounted in recesses provided therefor in said closure member with their open ends facing said closure ring and with their closed ends abutting against the inner end of said roller bearing.

9. A roller bearing railway car axle construction comprising an axle, a housing for the end portion thereof, a roller bearing interposed between said axle and said housing, a closure member mounted on said axle for closing one end of said housing, said closure member being adapted for movement with said axle relative to said housing, and means interposed between said closure member and said bearing for yieldably holding said closure member in engagement with said housing during movement of said closure member relative to said housing.

10. A roller bearing railway car axle construction comprising an axle, a housing for the end portion thereof, a roller bearing interposed between said axle and said housing, a closure member mounted on said axle for closing one end of said housing, said closure member being adapted for movement with said axle relative to said housing, and means interposed between said end of said housing and said bearing for maintaining a tight joint between said closure and said housing during relative movement thereof.

Signed at Canton, Ohio, this 3d day of Dec., 1927.

TRACY V. BUCKWALTER.